(12) United States Patent
Calmon

(10) Patent No.: US 11,366,697 B2
(45) Date of Patent: Jun. 21, 2022

(54) ADAPTIVE CONTROLLER FOR ONLINE ADAPTATION OF RESOURCE ALLOCATION POLICIES FOR ITERATIVE WORKLOADS USING REINFORCEMENT LEARNING

(71) Applicant: EMC IP Holding Company LLC, Hopkinton, MA (US)

(72) Inventor: Tiago Salviano Calmon, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/400,289

(22) Filed: May 1, 2019

(65) Prior Publication Data

US 2020/0348979 A1 Nov. 5, 2020

(51) Int. Cl.
 *G06F 9/50* (2006.01)
 *G06N 3/08* (2006.01)
 *G06N 20/00* (2019.01)

(52) U.S. Cl.
 CPC ............ *G06F 9/5038* (2013.01); *G06F 9/505* (2013.01); *G06F 9/5033* (2013.01); *G06N 3/08* (2013.01); *G06N 20/00* (2019.01)

(58) Field of Classification Search
 None
 See application file for complete search history.

(56) References Cited

U.S. PATENT DOCUMENTS

| 5,519,605 A | 5/1996 | Cawlfield et al. |
| 7,039,559 B2 | 5/2006 | Froehlich et al. |

(Continued)

FOREIGN PATENT DOCUMENTS

| CN | 108881283 A | * 11/2018 | |
| WO | WO-2007034826 A1 | * 3/2007 | ......... H04L 67/1008 |

OTHER PUBLICATIONS

Alsarhan et al, Adaptive Resource Allocation and Provisioning in Multi-Service Cloud Environments, 2017, IEEE, pp. 31-42 (Year: 2017).*

(Continued)

*Primary Examiner* — Abu Zar Ghaffari
(74) *Attorney, Agent, or Firm* — Ryan, Mason & Lewis, LLP

(57) ABSTRACT

Techniques are provided for adaptive resource allocation for workloads. One method comprises obtaining a dynamic system model based on a relation between an amount of at least one resource for one or more iterative workloads and at least one predefined service metric; obtaining, from a resource allocation correction module, an instantaneous value of the at least one predefined service metric; and applying to a controller: (i) instantaneous parameters of the dynamic system model, and (ii) a difference between the instantaneous value of the at least one predefined service metric and a target value for the at least one predefined service metric, wherein the controller determines an adjustment to the amount of the at least one resource for the one or more iterative workloads. The obtained system model is optionally updated over time based on an amount of at least one resource added and the one or more predefined service metrics.

20 Claims, 8 Drawing Sheets

(56) References Cited

U.S. PATENT DOCUMENTS

| | | | |
|---|---|---|---|
| 7,647,405 B2* | 1/2010 | Bivens | G06F 9/505 709/221 |
| 7,827,361 B1* | 11/2010 | Karlsson | G06F 9/5083 711/147 |
| 8,250,581 B1 | 8/2012 | Blanding | |
| 8,429,096 B1* | 4/2013 | Soundararajan | G06F 16/217 706/12 |
| 9,531,604 B2 | 12/2016 | Akolkar et al. | |
| 10,257,275 B1* | 4/2019 | Dirac | G06N 5/02 |
| 10,412,118 B1 | 9/2019 | Davis et al. | |
| 10,642,763 B2* | 5/2020 | Longo | G06F 11/3433 |
| 2002/0055989 A1 | 5/2002 | Stringer-Calvert et al. | |
| 2005/0188088 A1 | 8/2005 | Fellenstein | |
| 2006/0280119 A1 | 12/2006 | Karamanolis et al. | |
| 2006/0294044 A1 | 12/2006 | Karlsson et al. | |
| 2007/0088532 A1* | 4/2007 | Alvarez | G05B 17/02 703/2 |
| 2007/0162161 A1 | 7/2007 | Kumar et al. | |
| 2007/0234365 A1 | 10/2007 | Savit | |
| 2007/0276512 A1 | 11/2007 | Fan et al. | |
| 2007/0283016 A1* | 12/2007 | Pendarakis | H04L 12/66 709/226 |
| 2008/0022285 A1 | 1/2008 | Cherkasova | |
| 2008/0180247 A1 | 7/2008 | Deoalikar et al. | |
| 2010/0091786 A1 | 4/2010 | Liu et al. | |
| 2010/0168989 A1* | 7/2010 | Gao | F02D 41/2429 701/110 |
| 2010/0299655 A1 | 11/2010 | Heisch et al. | |
| 2010/0201573 A1 | 12/2010 | Lamming | |
| 2012/0110582 A1 | 5/2012 | Ferdous et al. | |
| 2013/0185433 A1 | 7/2013 | Zhu | |
| 2014/0211811 A1* | 7/2014 | Ludwig | H04L 41/0896 370/468 |
| 2015/0007182 A1 | 1/2015 | Rossbach et al. | |
| 2015/0040133 A1 | 2/2015 | Caufield | |
| 2016/0147203 A1* | 5/2016 | Di Cairano | G05B 13/042 700/30 |
| 2016/0162209 A1 | 9/2016 | Calderone et al. | |
| 2017/0048308 A1 | 2/2017 | Qaisar | |
| 2017/0161199 A1 | 6/2017 | Shah | |
| 2017/0242729 A1* | 8/2017 | Chen | H04L 41/5025 |
| 2017/0255491 A1* | 9/2017 | Bradshaw | G06F 9/505 |
| 2018/0101214 A1 | 4/2018 | Mahindru | |
| 2018/0176089 A1* | 6/2018 | Ritter | H04L 43/0876 |
| 2018/0246558 A1* | 8/2018 | Morad | G06F 1/329 |
| 2019/0075184 A1 | 3/2019 | Seed, IV et al. | |
| 2019/0101903 A1 | 4/2019 | Katti et al. | |
| 2019/0266015 A1* | 8/2019 | Chandra | G06F 9/5044 |
| 2019/0319861 A1 | 10/2019 | Pan et al. | |
| 2020/0099592 A1* | 3/2020 | Mahindru | G06F 16/1734 |
| 2020/0118039 A1* | 4/2020 | Kocberber | G06N 20/00 |
| 2020/0125545 A1* | 4/2020 | Idicula | G06F 16/217 |
| 2020/0167145 A1 | 5/2020 | Franchitti et al. | |
| 2020/0348979 A1 | 5/2020 | Calmon | |
| 2020/0177671 A1 | 6/2020 | Tofighbakhsh et al. | |
| 2020/0183338 A1* | 6/2020 | Tange | G05B 13/027 |
| 2020/0241921 A1 | 7/2020 | Calmon et al. | |
| 2020/0301741 A1* | 9/2020 | Gabrielson | G06F 9/4887 |

OTHER PUBLICATIONS

Liu et al, Adaptive Entitlement Control of Resource Containers on Shared Servers, IFIP/IEEE International Symposium on Integrated Network Management, 163-76 (Year: 2005).*
Huber et al. "Model-Based Self-Aware Performance and Resource Management Using the Descartes Modeling Language," in IEEE Transactions on Software Engineering, vol. 43, No. 5, pp. 432-452, May 1, 2017, doi: 10.1109/TSE.2016.2613863. (Year: 2017).*
U.S. Appl. No. 16/554,897, entitled, "Model-Based Initialization fo Workloads for Resource Allocation Adaptation", filed Aug. 29, 2019.
U.S. Appl. No. 16/554,910, entitled, "Early-Convergence Detection for Online Resource Allocation Policies for Iterative Workloads", filed Aug. 29, 2019.
Atzori et al., "The Internet of Things: A survey," Computer Networks, 54 (2010) 2787-2805.
Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: martinfowler. com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386). IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: en.wikipedia.org/wiki/Complex_event_processing.
"Publish-subscribe pattern," Available in: en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. Appl. 11, 4 (Dec. 2017), 427-443. DOI: doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets

(56) References Cited

OTHER PUBLICATIONS of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: en.wikipedia.org/wiki/Hypervisor.
"EdgeX Foundry," Available in: www.edgexfoundry.org.
"Orion Context Broker," Available in: catalogue.fiware.org/enablers/publishsubscribe-context-broker-orion-context-broker.
"FIWARE NGSI Open RESTful API Specification," Available in: forge.fiware.org/plugins/mediawiki/wiki/fiware/index.php/FI-WARE_NGSI_Open_RESTful_API_Specification. Last accessed: Jun. 28, 2018.
"ZeroMQ," Available in en.wikipedia.org/wiki/ZeroMQ.
D. Merkel, "Docker: Lightweight Linux Containers for Consistent Development and Deployment," Linux Journal, vol. 2, p. 234, (2014).
U.S. Appl. No. 16/401,604, entitled, "Resource Allocation and Provisioning in a Multi-Tier Edge-Cloud Virtualization Environment", filed May 2, 2019.
U.S. Appl. No. 16/263,135 entitled, "Adaptive Look-Ahead Configuration for Prefetching Data in Input/Output Operations," filed Jan. 31, 2019.
U.S. Appl. No. 16/397,596, entitled, "Adaptive Look-Ahead Configuration for Pre-Fetching Data in Input/Output Operations Based on Request Size and Frequency", filed Apr. 29, 2019.
Betts, et al., "Estimating the WCET of GPU-accelerated applications using hybrid analysis," Real-Time Systems (ECRTS), 2013.
Liu et al., "Adaptive entitlement control of resource containers on shared servers," IFIP/IEEE International Symposium on Integrated Network Management, pp. 163-176, May 2005.
K. Hornik, "Approximation capabilities of multilayer feedforward networks," Neural networks, vol. 2, No. 4, pp. 251-257, 1991.
U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
Abdelzaher et al., "Introduction to Control Theory And Its Application to Computing Systems", Performance Modeling and Engineering—Chapter 7 (Year: 2008).
Calmon et al., "Control strategies for adaptive resource allocation in cloud computing", 21st IFAC World Congress (Virtual), Berlin, Germany (Jul. 12-17, 2020).
Patikirikorala et al., "Towards Optimal Performance and Resource Management in Web Systems via Model Predictive Control", 2011 Australian Control Conference, Melbourne, Australia (Nov. 10 & 11, 2011).
Skarin et al., "An assisting Model Predictive Controller approach to Control over the Cloud", Lund University (May 15, 2019).
Sudarsan et al.; "Design and performance of a scheduling framework for resizable parallel applications", (Year: 2010).
Nguyen et al.; "Using Runtime Measured Workload Characteristics in Parallel Processor Scheduling", (Year: 1996).
Azhar et al.; "Sloop: QoS-Supervised Loop Execution to Reduce Energy on Heterogeneous Architectures", (Year: 2017).
Thamsen et al; "Continuously Improving the Resource Utilization of Iterative Parallel Dataflows", (Year: 2016).

\* cited by examiner

400

- At Each Milestone, Workload 100 Provides Feedback of Scoring Metric of Interest, y(k) (285);
- Correction Engine 250 Compares Current Scoring Metric of Interest, y(k), to Desired Score, r(k), of Particular Scoring Metric (e.g., an SLA metric);
- Correction Engine 250 Sends Correction Signal, e(k), to Controller 320;
- Controller 320 Takes Correction Signal, e(k), and Applies Predefined Rule based on Structure of Controller 320 to Suggest Resource Allocation Correction, $\widetilde{\Delta u}(k)$;
- Suggested Resource Allocation Correction, $\widetilde{\Delta u}(k)$, is Applied to Integrator Block 340 and Then Optionally Saturated by Block 350 to Stay Within Range of Available Resources; and
- System Model is Updated and Current Value of Scoring Metric 285 is Generated

FIG. 4A

ADAPTIVE CONTROLLER FOR ONLINE ADAPTATION OF RESOURCE ALLOCATION POLICIES FOR ITERATIVE WORKLOADS USING REINFORCEMENT LEARNING

FIELD

The field relates generally to resource allocation techniques.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Using an infrastructure efficiently to execute workloads while respecting Service Level Agreements (SLAs) and, thus, maintaining a specified Quality of Service, poses a number of challenges. Service providers aim to provide services to their customers while respecting SLAs and minimizing resource usage. One challenge is that SLAs are typically set prior to execution of a job, but the execution environment is subject to a number of possible disturbances (e.g., poor knowledge about actual resource needs, demand peaks and/or hardware malfunctions). Thus, employing a fixed amount of allocated resources may not be a good solution.

A need therefore exists for improved techniques for resource allocation for workload execution.

SUMMARY

In one embodiment, a method comprises obtaining a dynamic system model based on a relation between an amount of at least one resource for one or more iterative workloads and at least one predefined service metric; obtaining, from a resource allocation correction module, an instantaneous value of the at least one predefined service metric; and applying to a controller: (i) parameters of the dynamic system model, and (ii) a difference between the instantaneous value of the at least one predefined service metric and a target value for the at least one predefined service metric, wherein the controller determines an adjustment to the amount of the at least one resource for the one or more iterative workloads.

In some embodiments, the obtained system model is: (i) derived from a relation between an amount of at least one resource added and the predefined service level metric, and/or (ii) predefined based on the relation between the amount of the at least one resource added. The obtained system model is optionally updated over time based on the amount of the at least one resource added and the one or more predefined service metrics. The at least one resource comprises, for example, a number of processing cores, an amount of memory and/or an amount of network bandwidth.

Other illustrative embodiments include, without limitation, apparatus, systems, methods and computer program products comprising processor-readable storage media.

BRIEF DESCRIPTION OF THE DRAWINGS

FIG. 4A illustrates exemplary pseudo code for a pipeline of the correction engine of FIG. 2, according to one embodiment of the disclosure;

DETAILED DESCRIPTION

Figure 1:
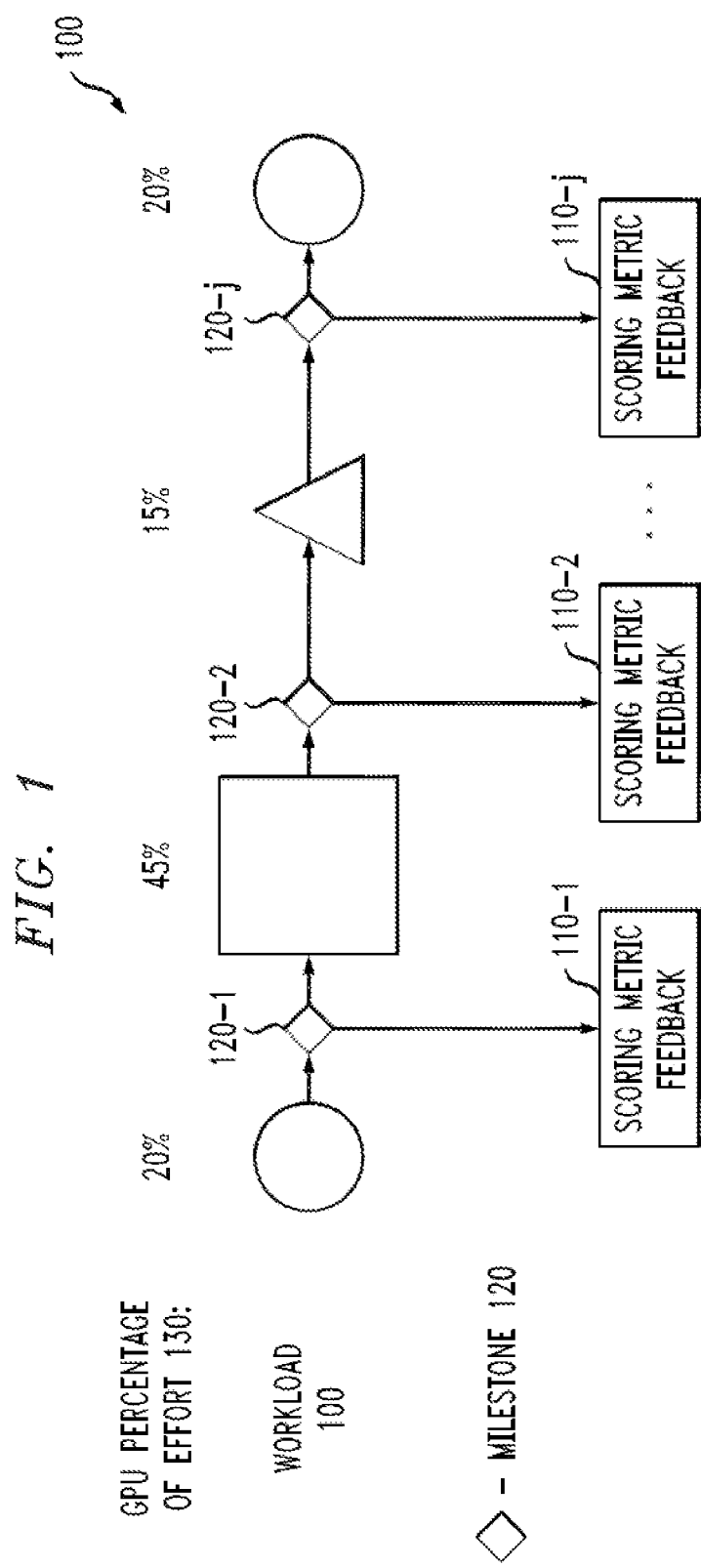
FIG. 1 illustrates a given workload with milestones and associated effort for a given infrastructure, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adapting a resource allocation for a particular workload.

In one or more embodiments, control theory-based techniques are provided for adapting resource allocations for a particular workload. In some embodiments, a resource allocation is adapted using information feedback to control a behavior of the workload. Generally, control theory, and, specifically, feedback control, have strong mathematical foundations and ensure important characteristics such as stability, resiliency to disturbances and robustness. See, for example, Katsuhiko Ogata, Modern Control Engineering (Fifth Edition; India: Prentice Hall, 2002).

In one embodiment, the disclosed techniques for adapting a resource allocation for a particular workload are lightweight and may work as a cost minimization algorithm. This feature is present not only when the allocation occurs, but also for the determination of intermediate measurements. In this manner, the resource allocation adaptation does not interfere with the actual workload. Such features could also be mimicked by usage of, for instance, optimization routines. However, optimization routines may take a long time to run, and this is prohibitive in terms of quick online adaptation. Also, just running such algorithms would impose a new, heavy workload, which is also a burden to the infrastructure.

In cloud computing environments, a number of resource abstractions have emerged, such as containers. Containers allow providers to offer computation without customers knowing which underlying infrastructure is executing the software code. This can be achieved in the Platform-as-a-Service (PaaS) paradigm and also the Function-as-a-Service (FaaS) paradigm (also known as serverless computing).

In the PaaS and FaaS paradigms, the usual agreements regarding a quality of service expected by the customer are typically expressed through several SLAs. SLAs may include, for example, response time, execution time and uptime percentage. The levels of SLAs are usually agreed upon prior to the service through reference values often referred to as SLA metrics, and must be followed. If the SLA agreements are not satisfied, the providers must typically pay fines and may also diminish the trust that a customer perceives of the service.

One way to ensure SLAs is to dedicate an amount of resources to them. There are two problems with this approach. Firstly, in general, an application cannot be assumed to be bounded by one particular resource. Some applications, for example, might have an IO-intensive phase and, afterwards, a compute-intensive phase. Dedicating resources to an application in such a scenario might be inefficient, resulting in spare resources at the different phases of the application. In addition, the initial estimate of how many resources are needed to run an application might be either oversized or undersized.

While SLAs are typically set prior to the execution of a job, the execution environment is quite dynamic. New workloads might come and compete for resources and unplanned demand peaks might occur, which may disrupt the original workload planning due to tasks with higher priorities, a greater need to share the environment and/or overheads because of context switching.

Service providers aim to provide services to their customers while respecting SLAs and minimizing resource usage. This is the scenario that provides the optimal profit for them. To do so, a static approach of allocation, which dedicates resources to a job from its start through its completion, is naturally inefficient, and, thus, sub-optimal. In this invention, we propose a methodology to dynamically allocate resources based on feedback of the job execution and prior knowledge of its stages.

A characteristic of infrastructure provision is the variability in perceived demand. Since service providers are willing to charge an amount per computation usage, and these providers can have a lot of customers, it is natural that the demand varies within different time frames, on a daily basis, a weekly basis and even a monthly basis. This demand variation itself imposes a number of challenges, since the intention of the provider is to serve each customer at the level of service defined in a contract.

The aforementioned contracts, typically materialized in multiple SLAs, also impose a significant challenge. The contracts are typically set prior to the service provisioning. Thus, no matter what happens at the time of execution, these SLAs must be respected. Examples of events that could disrupt service providers include, but are not limited to, sharp demand peaks, malfunction of machines and unrealistic contracts. In some cases, it is not possible to reach every single SLA, and it is also an important decision to prioritize some of the workloads to the detriment of others. Thus, there are a number of challenges.

Service providers aim to comply with all contracts made with their respective customers. Even though some knowledge of the future workloads exists and a demand prediction engine may be set, there are often some errors, which may make it infeasible to respect all SLAs. Furthermore, there are multiple kinds of agreements, which might range from sharp agreements (e.g., to meet the SLA requirements generates a level of revenue; and to break the SLA requirements generates a penalty) to softer ones (e.g., the level of revenue generated for the service provider by running a workload depends on the performance). In addition, hardware must not be assumed to always be running perfectly, because malfunctions may occur. Each of these situations will require actions by the provider to mitigate issues while impacting the execution of all workloads to an acceptable minimum.

One way to ensure SLAs is to dedicate a certain amount of resources to a particular job. This solution might lead to a full fulfillment of SLAs, but the solution is not cost effective. Workloads might have different needs over time, for example, or they may be intensive for a single resource but not for other resources. To dedicate devices for some workloads is not suitable on both ends of the demand spectrum: on one end, there is the situation when demand is low and dedicating resources is possible, but not cost effective. On the other end of the spectrum, if demand is high, dedicating resources will lead to fewer workloads executed over time, which reduces the overall throughput of the provider, which is reflected in reduced revenue generated.

Control Theory-Based Resource Allocation Adaptation

One or more embodiments provide a mechanism to automatically adapt an infrastructure in order to accommodate workload necessity. The exemplary disclosed mechanism works by measuring the current performance of a workload and comparing the measured current performance to reference levels. This comparison allows on-the-fly adaptations to be performed and ensures a substantially maximum profit generation by respecting the SLAs associated with the workloads with higher profit generation potential, or the ones that lead to the highest fines if not respected.

FIG. 1 illustrates a given workload 100 with well-defined milestones 120 and associated effort 130 for a given infrastructure, according to one embodiment of the disclosure. One example of this kind of job is the training of a Deep Neural Network, which is performed in fixed-size iterations. It is assumed that workload 100 will produce information feedback 110-1 through 110-$n$, such as a scoring metric feedback 110-1, a scoring metric feedback 110-2, and a scoring metric feedback 110-$n$.

As shown in Adam Betts and Alastair F. Donaldson, "Estimating the WCET of GPU-Accelerated Applications Using Hybrid Analysis," *Real-Time Systems (ECRTS)* (2013), incorporated by reference herein in its entirety, ultimately, source code can be instrumented to perform such actions. So, this step is considered feasible for all kinds of jobs. In more well-behaved and specific embodiments, the source code is instrumented with intermediate feedback as a design decision.

As shown in FIG. 1, the percentage of effort 130 for a given infrastructure, such as a graphics processing unit (GPUs), is indicated between each exemplary milestone 120-1 through 120-$j$ of the workload 100.

Figure 2:
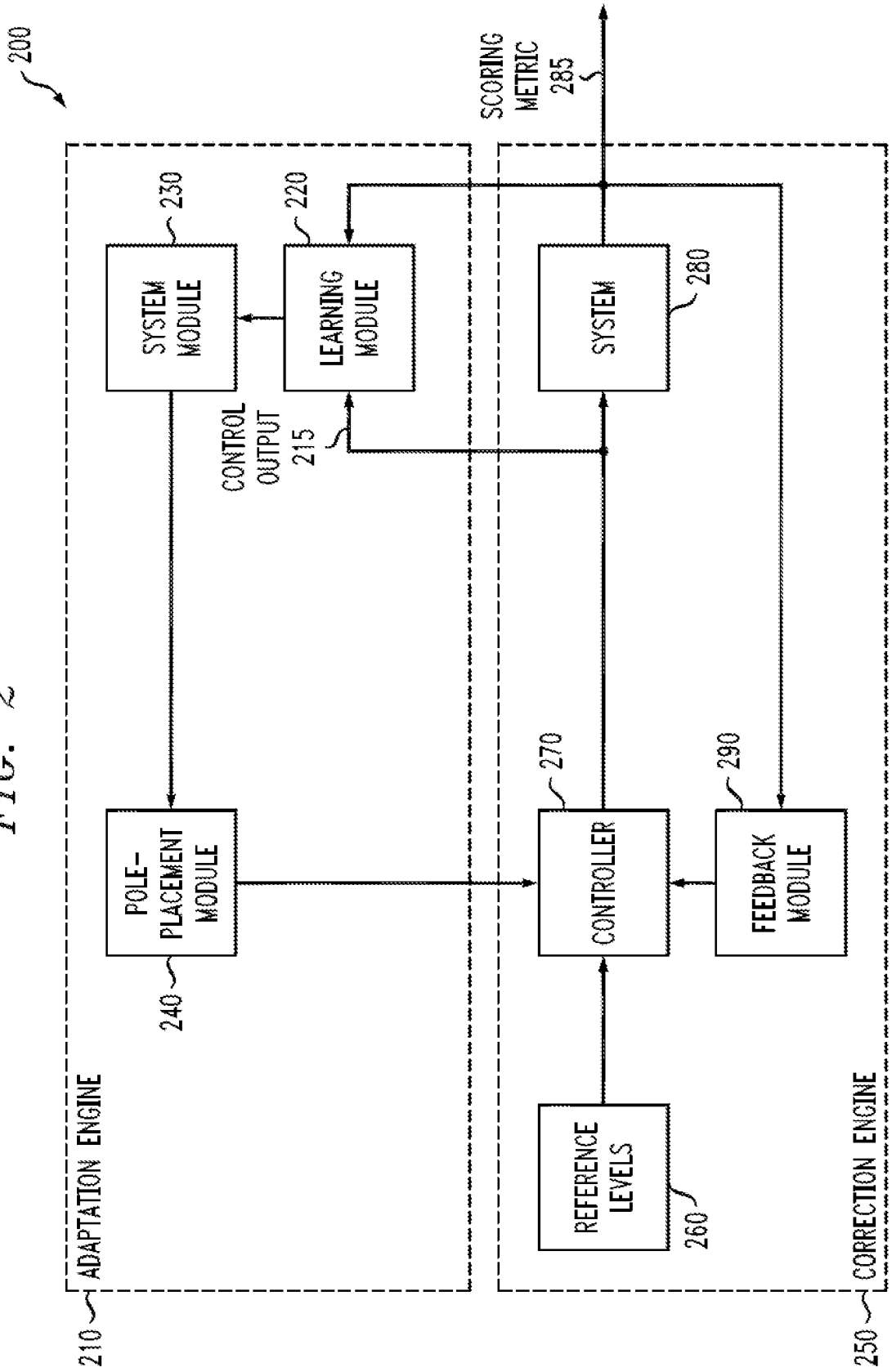
FIG. 2 illustrates a block diagram of an exemplary adaptation-correction system, according to some embodiments.

FIG. 2 illustrates a block diagram of an exemplary adaptation-correction system 200, according to some embodiments. As shown in FIG. 2, the exemplary adaptation-correction system 200 comprises two structures, namely, an adaptation engine 210 and a correction engine 250.

Generally, the exemplary adaptation engine 210 aims to map decisions and responses in order to get a transfer function between allocations and a given SLA metric, as discussed further below in conjunction with FIG. 4A. The exemplary adaptation engine 210 comprises a learning module 220, a system model 230, and a pole-placement module 240, discussed below in conjunction with FIG. 3. The learning module 220 processes a control output 215 from the correction engine 250, such as the amount of resources added (u(k)), and a scoring metric 285, such as a response time of a particular processing step.

Likewise, the exemplary correction engine 250 suggests changes to the allocated amount of resources in order to ensure the SLA, as discussed further below in conjunction with FIG. 5. The exemplary correction engine 250 generates a current value of a scoring metric 285 and comprises a set of reference levels 260, a controller 270, a system representation 280 and a feedback module 290, discussed below in conjunction with FIG. 3.

Figure 3:
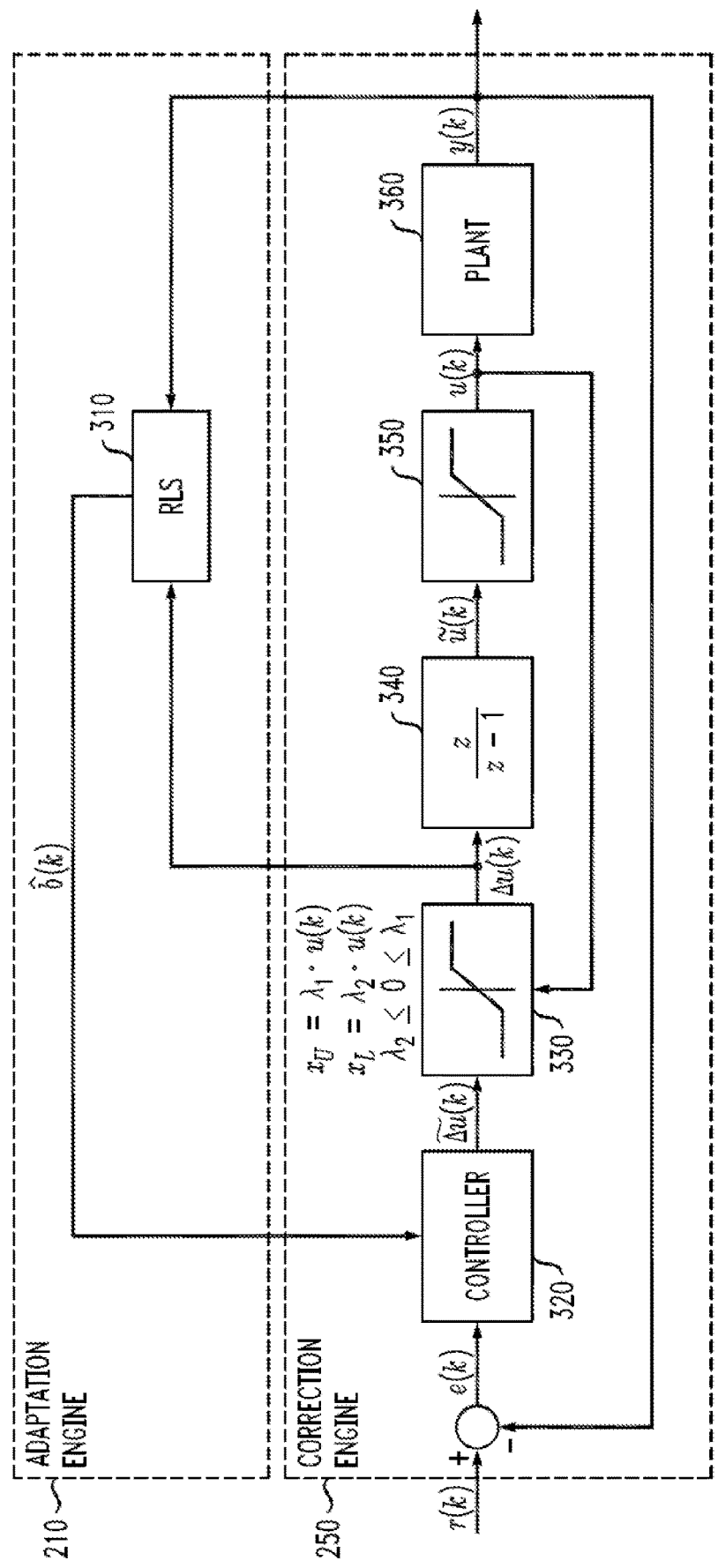
FIG. 3 illustrates an exemplary implementation of the adaptation-correction system of FIG. 2 in further detail, according to one or more embodiments of the disclosure.

FIG. 3 illustrates an exemplary implementation 300 of the adaptation-correction system 200 of FIG. 2 in further detail, according to one or more embodiments of the disclosure. In at least one embodiment, the adaptation engine 210 and the correction engine 250 work in tandem to ensure the SLA and perform simultaneous actions.

Adaptation Engine 210

As shown in FIG. 3, a Recursive Least Squares (RLS) module 310 in the adaptation engine 210 learns system parameters b(k), which are generated by the relation between the amount of resources added (u(k)) and the response time of the particular step y(k)).

The adaptation engine 210 may not be needed if a dynamic between resource allocation and a given SLA metric could be defined for each workload and this dynamic was the same or, at least, very similar. Since this typically cannot be assumed for each resource allocation-SLA metric pair, a learning step is needed. Even in the same job, multiple kinds of workloads might generate different allocation dynamics.

The dynamic relation between resource allocation and SLA metric is represented by Equation (1), below. It can be assumed, however, that these relationships can be mapped by a first order differential equation, as shown by X. Liu et al., "Adaptive Entitlement Control of Resource Containers on Shared Servers," *IFIP/IEEE International Symposium on Integrated Network Management,* 163-76 (May 2005), incorporated by reference herein in its entirety.

$$x(k+1)=a \cdot x(k)+b \cdot u(k) \quad (1)$$

Equation (1) is a first-order differential equation with parameters to be discovered used as a system model for the relation between resource allocation and SLA metric In Equation (1), a and b are the parameters to learn, which can be learned using any regression algorithms. The parameter a represents the current SLA metric observation, whereas b represents the effect of a different allocation u(k).

The output of the RLS module 310 is a parametrized system model, $\hat{b}(k)$, that will be used by the pole-placement module 240 in the adaptation engine 210 (where $\hat{b}$ is applied to the controller 320). The pole-placement module 240 ensures a desired closed loop dynamic between the system input (the amount of allocated resources, r(k)) and the output, y(k) (a value of a given SLA metric).

Correction Engine 250

As shown in FIG. 3, the correction engine 250 works by receiving feedback of the execution conditions, y(k), (typically, a given SLA metric) as well as the current learned model, $\hat{b}(k)$, generated by the RLS module 310 of the adaptation engine 210, as discussed hereinafter. The correction engine 250 uses this information to calculate the pole placement of the closed loop system. The pole placement calculation can be performed using Laplace Transforms, for example, when the differential equations are linear and with a finite order, or by using machine learning algorithm(s) in the more general cases, since a neural network with hidden layers is a universal approximator. See, for example, K. Hornik, "Approximation Capabilities of Multilayer Feedforward Networks," *Neural Networks*, Vol. 2, No. 4, 251-57 (1991), incorporated by reference herein in its entirety.

As shown in FIG. 3, a proportional controller 320 takes the parameter $\hat{b}(k)$ learned by the adaptation engine 210 and uses the parameter, $\hat{b}(k)$, to modify the feedback loop dynamics, which is fed by (r(k)−y(k)=e(k)), where r(k) is a target value of the scoring metric 285 of interest, such as a target response time, and y(k) is the current value of the scoring metric 285, such as the response time of the particular step, to obtain an error, e(k).

The relation of the amount of resources added (u(k)) and the response time of the particular step y(k) is assumed to be piecewise linear, and a saturation module 330 is added after the controller 320 in order to bound the error between the assumed dynamics and the actual dynamics. In some embodiments, the saturation module 330 is adaptive as well, and has two parameters, $\lambda_1$ and $\lambda_2$, as shown in FIG. 3. These two parameters, $\lambda_1$ and $\lambda_2$, are associated with a trade-off between allowed oscillation around the set-point and convergence rates. The smaller the absolute value of these parameters are, the less the system 280 will oscillate, but convergence will be slower. An example of a particular parametrization of both parameters, $\lambda_1$ and $\lambda_2$, is discussed below in a section entitled "Example."

In the embodiment of FIG. 3, the system 280 of FIG. 2 is implemented using an integrator block 340, a saturation block 350 and a plant block 360. As shown in FIG. 3, the output of the saturation module 330 is processed by the integrator block 340, represented by the equation $$\frac{z}{z-1},$$

representing an integrator block in the Z-transform domain. The integrator block 340 represents that, in some embodiments, the output from the controller 320 and saturation module 330 is an increment in the current allocation, rather than a full allocation. To illustrate, suppose an allocation at time instant k is x(k)=4.1, the control output from the saturation module 330 is u(k)=0.1 and model parameter a=1. A next allocation according to equation (1) will be x(k+1)=4.1+0.1=4.2, instead of just 0.1, which means that the integrator block 340 will sum the contribution of the current control output, u(k), to the current allocation to obtain a new allocation.

The output of the integrator block 340 is processed by saturation block 350, which prevents the allocation from exceeding the amount of available resources (e.g., processing cores, memory or network bandwidth available) of the device. Thus, the inferior limit of the saturation block 350 is 0 in most implementations and the superior limit of the saturation block 350 is MAX_RESOURCE, where MAX_RESOURCE is the number of processing cores, amount of memory or amount of network bandwidth available of the device, depending on the resource that is being controlled (computation, memory or network, respectively). Finally, the plant block 360 translates the allocation, x(k), into a new SLA metric, y(k). In other words, the plant block 360 is typically implemented as a highly nonlinear function modeled as a first-order differential equation that continually learns the system model, $\hat{b} \sim b$, at each iteration.

FIG. 4A illustrates exemplary pseudo code 400 for a pipeline of the correction engine 250, according to one embodiment of the disclosure. As shown in FIG. 4A, the pipeline of the correction engine 250 is executed by the following steps:

1. At each milestone, the workload 100 provides feedback of the scoring metric 285 of interest, y(k) (285);
2. The correction engine 250 compares the current scoring metric of interest, y(k), to the desired score, r(k), of the particular scoring metric (e.g., an SLA metric);
3. The correction engine 250 sends a correction signal, e(k), to the controller 320;
4. The controller 320 takes the correction signal, e(k), and applies a predefined rule based on the structure of the controller 320 (e.g., proportional, proportional-integral, pole-placement and/or fuzzy structures) to suggest the resource allocation correction, $\widetilde{\Delta u}(k)$.
5. The suggested resource allocation correction, $\widetilde{\Delta u}(k)$, is applied to an integrator block 340 and then optionally saturated by block 350 to stay within the range of available resources.
6. The system model is updated and the current value of the scoring metric 285 is generated.

Figure 4B:
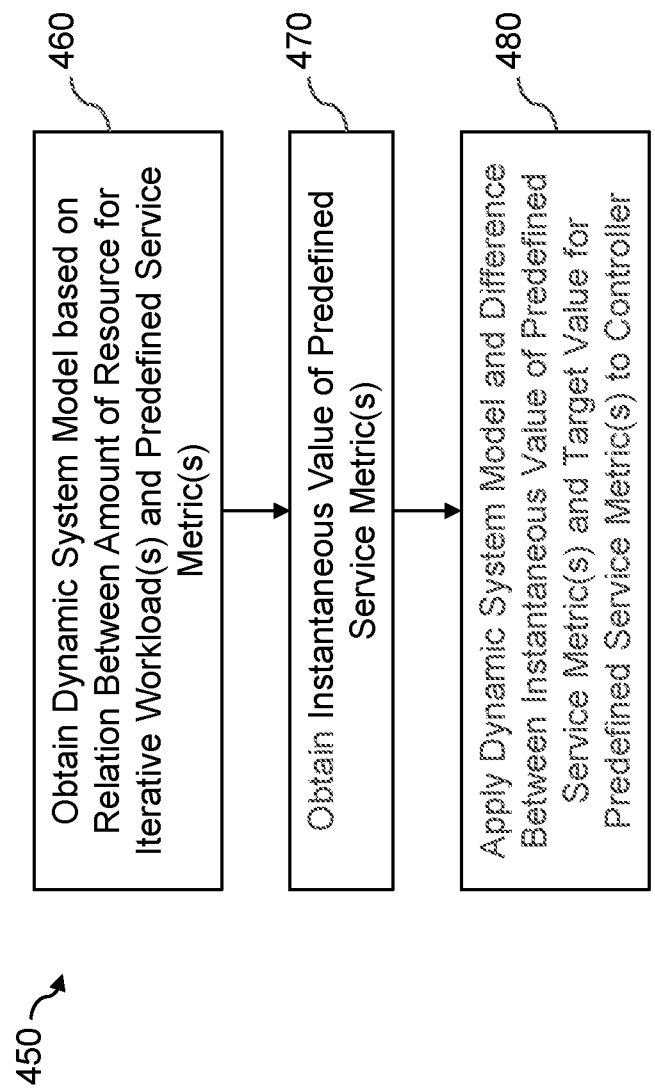
FIG. 4B is a flow chart illustrating an exemplary implementation of a resource allocation adaptation process for adapting resources for a particular workload, according to one embodiment of the disclosure.

FIG. 4B is a flow chart illustrating an exemplary implementation of a resource allocation adaptation process 450 for adapting a particular workload, according to one embodiment of the disclosure. As shown in FIG. 4B, during step 460, the exemplary resource allocation adaptation process 450 initially obtains the dynamic system model during step 460, based on the relation between an amount of one or more resource(s) for one or more iterative workload(s) and predefined service metric(s). During step 470, the exemplary resource allocation adaptation process 450 obtains instantaneous values of the one or more predefined service metric(s). Finally, during step 480, the exemplary resource allocation adaptation process 450 applies the dynamic system model and a difference between the instantaneous value of the predefined service metric(s) and the target value for the predefined service metric(s) to the controller 270 of FIG. 2.

Example

Training Deep Learning models is a common task that is very resource intensive. One characteristic of the training workload is that the workload is performed in fixed-size iterations, and each of these iterations receive the name of epoch. The number of training epochs is a parameter, which means the milestones of the job can be defined, and at each iteration, the rate of completion in percentage can be expressed as 100*i/n %, where i is the epoch number and n is the number of epochs specified. More granular milestones can be used in this particular example, since processing each batch within an epoch is also a fixed size task, but this choice makes the mechanism prone to noisy control actions.

Assuming that the SLA metric to be controlled is the execution time (et=T), one can feedback the amount of time t it takes to complete an epoch and compare this time to the desired time per epoch, which is T/n. If an epoch took longer than T/n to finish, more resources might me be needed. On the other hand, if the time t is significantly smaller than T/n, this indicates that the job does not need the amount of resources currently allocated to the job and reducing the allocation can decrease costs and even make room for additional jobs to run.

Figure 5:
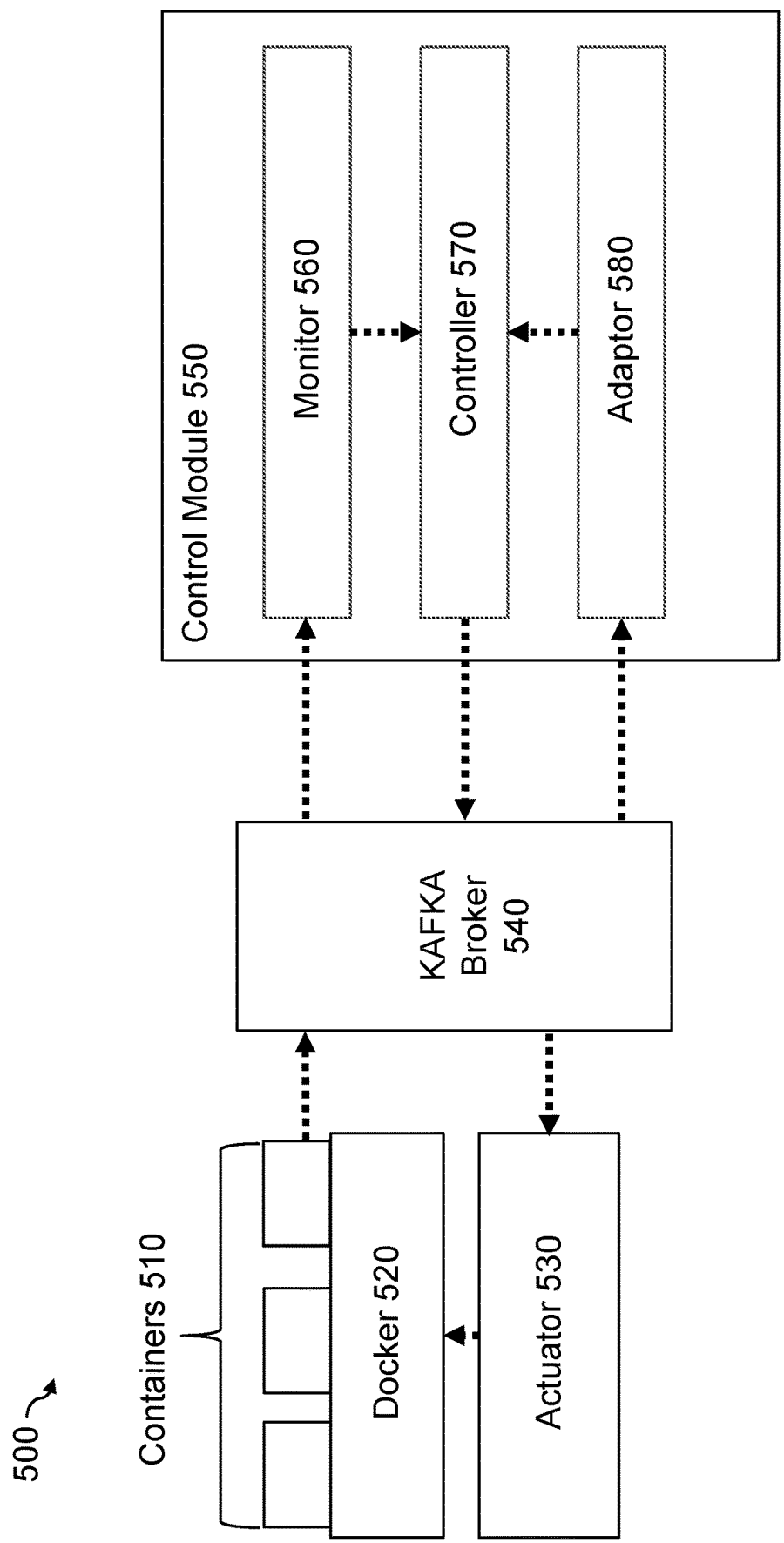
FIG. 5 illustrates an exemplary implementation of the disclosed resource allocation adaptation techniques, according to some embodiments.

FIG. 5 illustrates an exemplary implementation 500 of the disclosed resource allocation adaptation techniques, according to some embodiments. The exemplary implementation 500 uses a plurality of containers 510, such as Docker containers 520, that execute the iterative workloads in a shared execution environment, to implement the controller 270 of FIG. 2. Generally, Docker is a well-known lightweight container solution for multiple Operating Systems (OSs), offering controls over central processing unit (CPU) and memory limits.

One of the containers 510 is chosen as the controller container (corresponding to the system 280 of FIG. 2) and metrics are measured in real-time. Messaging between the Docker container 520 and a control module 550 is implemented in the embodiment of FIG. 5 using a KAFKA message broker 540, in a known manner. The control module 550 comprises a monitor 560, a controller 570 and an adaptor 580. The exemplary monitor 560 is a possible implementation of the feedback module 290, controller 570 implements the elements in the correction engine 250 and the adaptor 580 implements the mechanisms in the adaptation engine 210 of FIG. 2, and operate in a similar manner as described above.

At the end of each iteration, the containers 510 send their performance metric to a KAFKA message broker 540, from which the monitor 560 and the adaptor 580 are listening. The monitor 560 takes the metric and sends it to the controller 570. The adaptor 580 infers a new parameter $\hat{b}$ and also sends it to the controller 570. Finally, the controller 570 generates a new increment in allocation, which is sent to an actuation topic of KAFKA message broker 540. The actuator 530 is listening to this topic, and changes allocation when a new message arrives.

In some embodiments, the disclosed techniques for adapting a resource allocation for a particular workload reduce an amount of time needed to perform a resource allocation for iterative workloads. One or more embodiments of the disclosure provide improved methods, apparatus and computer program products for adapting a resource allocation for a particular workload. The foregoing applications and associated embodiments should be considered as illustrative only, and numerous other embodiments can be configured using the techniques disclosed herein, in a wide variety of different applications.

It should also be understood that the disclosed adaptive resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adapting a resource allocation for iterative workloads may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
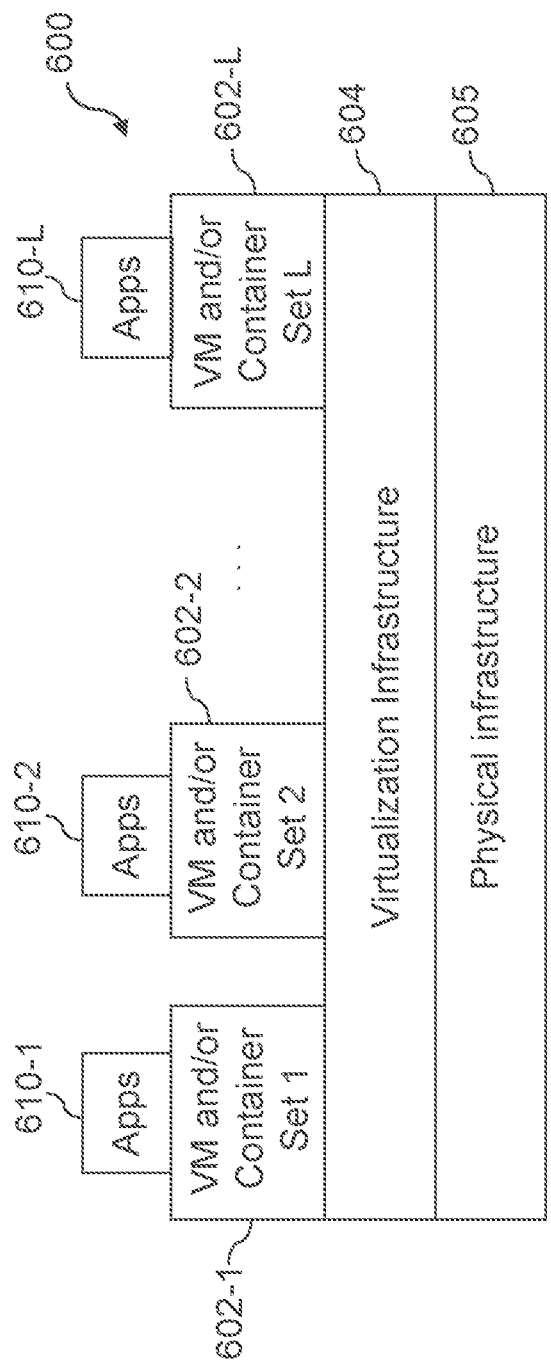
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the system 200. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide resource allocation functionality of the type described above for one or more processes running on a given one of the VMs. For example, each of the VMs can implement resource allocation control logic for providing adaptive resource allocation for workloads for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic and for use in performing adaptive resource allocation for workloads.

As is apparent from the above, one or more of the processing modules or other components of system 200 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
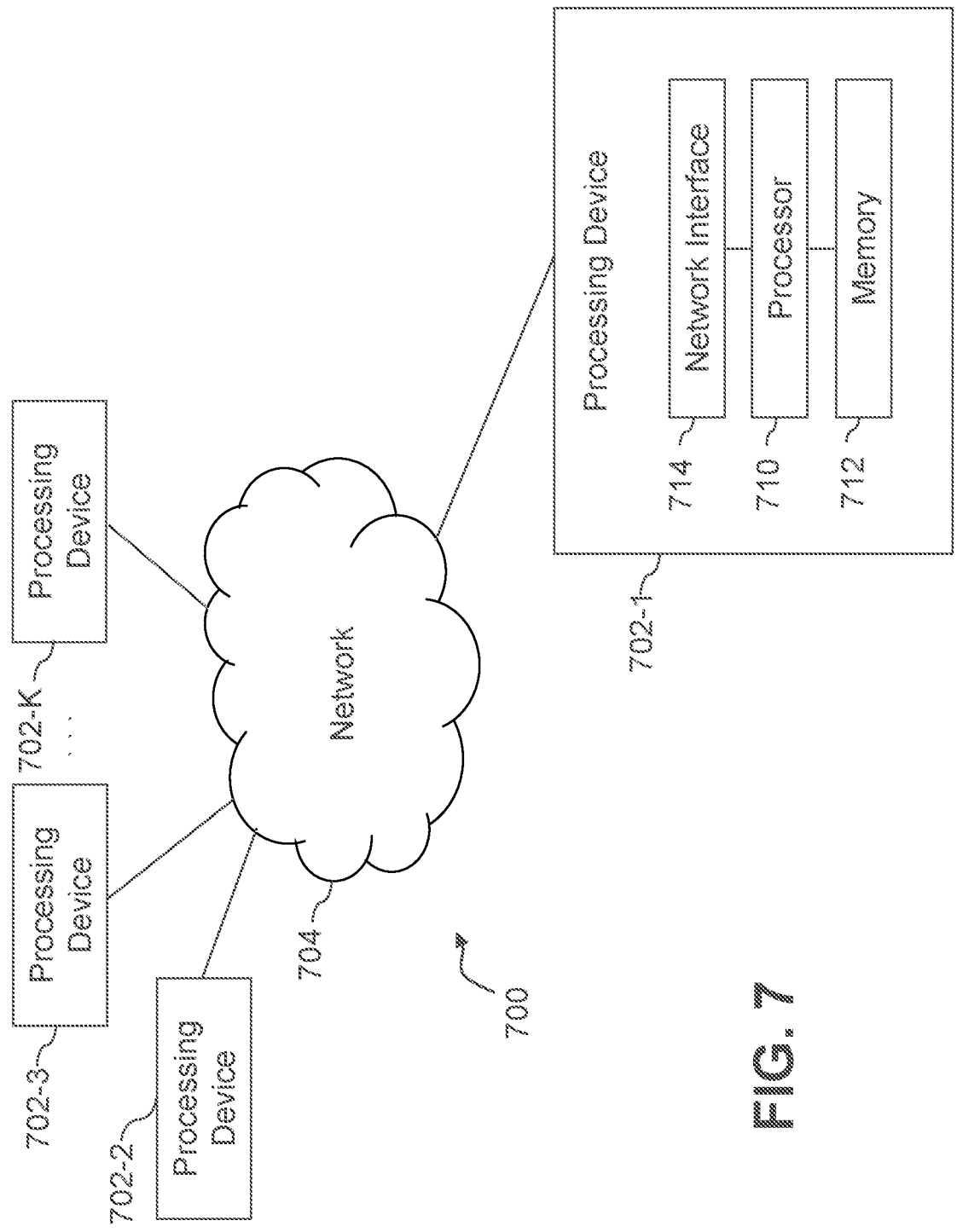
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a dynamic system model that relates (i) an amount of at least one resource provided by an execution environment that executes one or more iterative workloads and (ii) at least one predefined service metric indicating a level of service provided by the execution environment for the one or more iterative workloads, wherein at least a first parameter and a second parameter of a plurality of parameters of the obtained dynamic system model are learned for a plurality of iterations of the one or more iterative workloads, wherein the learned first parameter represents an effect, on a value of the at least one predefined service metric, of an adjustment to the amount of the at least one resource provided by the execution environment and wherein the learned second parameter represents an obtained instantaneous value of the at least one predefined service metric; and applying to a controller: (i) the dynamic system model for a given iteration of the plurality of iterations of the one or more iterative workloads, and (ii) a difference between the instantaneous value for the given iteration of the at least one predefined service metric and a target value for the at least one predefined service metric, wherein the controller determines an adjustment, based at least in part on the difference and using the first parameter to modify one or more dynamics of a feedback loop that determines the difference, to the amount of the at least one resource to be applied in the execution environment for the one or more iterative workloads;

wherein the method is performed by at least one processing device comprising a processor coupled to a memory.

2. The method of claim 1, wherein the obtained dynamic system model is one or more of: (a) derived from a relation between (i) an amount of at least one resource added in the execution environment in a given iteration and (ii) the predefined service level metric and (b) predefined based at least in part on the relation between the amount of the at least one resource added in the execution environment and the predefined service level metric.

3. The method of claim 1, wherein the obtained dynamic system model is updated over time based on an amount of at least one resource added in the execution environment in a given iteration and the one or more predefined service metrics for the given iteration.

4. The method of claim 1, wherein the iterative workload comprises a training of a Deep Neural Network.

5. The method of claim 1, further comprising the step of applying the adjustment to the amount of at least one resource to a saturation model that bounds the difference between the instantaneous value of the at least one predefined service metric and one or more of the minimum and maximum values for the at least one predefined service metric.

6. The method of claim 1, further comprising the step of applying the adjustment to the amount of at least one resource to an integrator that generates a cumulative resource allocation based on the adjustment to the amount of at least one resource for the one or more iterative workloads.

7. The method of claim 6, further comprising the step of applying the cumulative resource allocation to a saturation model that bounds an applied resource allocation within an available amount of at least one resource.

8. The method of claim 1, wherein the at least one resource comprises one or more of a number of processing cores, an amount of memory and an amount of network bandwidth.

9. A computer program product, comprising a non-transitory machine-readable storage medium having encoded therein executable code of one or more software programs, wherein the one or more software programs when executed by at least one processing device perform the following steps:
obtaining a dynamic system model that relates (i) an amount of at least one resource provided by an execution environment that executes one or more iterative workloads and (ii) at least one predefined service metric indicating a level of service provided by the execution environment for the one or more iterative workloads, wherein at least a first parameter and a second parameter of a plurality of parameters of the obtained dynamic system model are learned for a plurality of iterations of the one or more iterative workloads, wherein the learned first parameter represents an effect, on a value of the at least one predefined service metric, of an adjustment to the amount of the at least one resource provided by the execution environment and wherein the learned second parameter represents an obtained instantaneous value of the at least one predefined service metric;
and
applying to a controller: (i) the dynamic system model for a given iteration of the plurality of iterations of the one or more iterative workloads, and (ii) a difference between the instantaneous value for the given iteration of the at least one predefined service metric and a target value for the at least one predefined service metric, wherein the controller determines an adjustment, based at least in part on the difference and using the first parameter to modify one or more dynamics of a feedback loop that determines the difference, to the amount of the at least one resource to be applied in the execution environment for the one or more iterative workloads.

10. The computer program product of claim 9, wherein the obtained dynamic system model is one or more of: (a) derived from a relation between (i) an amount of at least one resource added in the execution environment in a given iteration and (ii) the predefined service level metric and (b) predefined based at least in part on the relation between the amount of the at least one resource added in the execution environment and the predefined service level metric.

11. The computer program product of claim 9, wherein the obtained dynamic system model is updated over time based on an amount of at least one resource added in the execution environment in a given iteration and the one or more predefined service metrics for the given iteration.

12. The computer program product of claim 9, wherein the iterative workload comprises a training of a Deep Neural Network.

13. The computer program product of claim 9, further comprising the step of applying the adjustment to the amount of at least one resource to one or more of: (i) a saturation model that bounds the difference between the instantaneous value of the at least one predefined service metric and one or more of the minimum and maximum values for the at least one predefined service metric; and (ii) an integrator that generates a cumulative resource allocation based on the adjustment to the amount of at least one resource for the one or more iterative workloads.

14. The computer program product of claim 9, wherein the at least one resource comprises one or more of a number of processing cores, an amount of memory and an amount of network bandwidth.

15. An apparatus, comprising:
a memory; and
at least one processing device, coupled to the memory, operative to implement the following steps:
obtaining a dynamic system model that relates (i) an amount of at least one resource provided by an execution environment that executes one or more iterative workloads and (ii) at least one predefined service metric indicating a level of service provided by the execution environment for the one or more iterative workloads, wherein at least a first parameter and a second parameter of a plurality of parameters of the obtained dynamic system model are learned for a plurality of iterations of the one or more iterative workloads, wherein the learned first parameter represents an effect, on a value of the at least one predefined service metric, of an adjustment to the amount of the at least one resource provided by the execution environment and wherein the learned second parameter represents an obtained instantaneous value of the at least one predefined service metric;
and
applying to a controller: (i) the dynamic system model for a given iteration of the plurality of iterations of the one or more iterative workloads, and (ii) a difference between the instantaneous value for the given iteration of the at least one predefined service metric and a target value for the at least one predefined service metric, wherein the controller determines an adjustment, based at least in part on the difference and using the first parameter to modify one or more dynamics of a feedback loop that determines the difference, to the amount of the at least one resource to be applied in the execution environment for the one or more iterative workloads.

16. The apparatus of claim 15, wherein the obtained dynamic system model is one or more of: (a) derived from a relation between (i) an amount of at least one resource added in the execution environment in a given iteration and (ii) the predefined service level metric and (b) predefined based at least in part on the relation between the amount of the at least one resource added in the execution environment and the predefined service level metric.

17. The apparatus of claim 15, wherein the obtained dynamic system model is updated over time based on an amount of at least one resource added in the execution environment in a given iteration and the one or more predefined service metrics for the given iteration.

18. The apparatus of claim 15, further comprising the step of applying the adjustment to the amount of at least one resource to one or more of: (i) a saturation model that bounds the difference between the instantaneous value of the at least one predefined service metric and one or more of the minimum and maximum values for the at least one predefined service metric; and (ii) an integrator that generates a cumulative resource allocation based on the adjustment to the amount of at least one resource for the one or more iterative workloads.

19. The apparatus of claim 15, wherein the at least one resource comprises one or more of a number of processing cores, an amount of memory and an amount of network bandwidth.

20. The apparatus of claim 15, wherein the iterative workload comprises a training of a Deep Neural Network.

\* \* \* \* \*